United States Patent
Yang et al.

(10) Patent No.: US 10,227,426 B2
(45) Date of Patent: Mar. 12, 2019

(54) ANTISTATIC POLYMERS AND METHODS OF MAKING THE SAME

(71) Applicant: 3M INNOVATIVE PROPERTIES COMPANY, St. Paul, MN (US)

(72) Inventors: Yu Yang, Eden Prairie, MN (US); Jason M. Kehren, Stillwater, MN (US); Suresh S. Iyer, Woodbury, MN (US); William M. Lamanna, Stillwater, MN (US); Thomas P. Klun, Lakeland, MN (US); Jeffrey A. Peterson, Hugo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 102 days.

(21) Appl. No.: 15/532,856

(22) PCT Filed: Dec. 4, 2015

(86) PCT No.: PCT/US2015/063920
§ 371 (c)(1),
(2) Date: Jun. 2, 2017

(87) PCT Pub. No.: WO2016/099948
PCT Pub. Date: Jun. 23, 2016

(65) Prior Publication Data
US 2017/0355794 A1    Dec. 14, 2017

Related U.S. Application Data

(60) Provisional application No. 62/092,562, filed on Dec. 16, 2014.

(51) Int. Cl.
*C08F 210/02*    (2006.01)
*C09D 123/08*    (2006.01)

(52) U.S. Cl.
CPC ...... *C08F 210/02* (2013.01); *C09D 123/0869* (2013.01)

(58) Field of Classification Search
CPC .... C08F 210/02; C08F 222/06; C08F 222/10; C08F 8/46
See application file for complete search history.

(56) References Cited

U.S. PATENT DOCUMENTS

| | | | |
|---|---|---|---|
| 3,641,199 A | 2/1972 | Niederhauser | |
| 3,700,643 A | 10/1972 | Smith | |
| 3,887,450 A | 6/1975 | Gilano | |
| 3,895,949 A | 7/1975 | Akamatsu | |
| 3,931,117 A | 1/1976 | Leonard | |
| 6,372,829 B1 | 4/2002 | Lamanna | |
| 6,495,243 B1 | 12/2002 | Malhotra | |
| 6,592,988 B1 | 7/2003 | Thompson | |
| 6,706,920 B2 | 3/2004 | Lamanna | |
| 6,740,413 B2 | 5/2004 | Klun | |
| 6,784,237 B2 | 8/2004 | Thompson | |
| 6,924,329 B2 | 8/2005 | Klun | |
| 7,361,706 B2 | 4/2008 | Thompson | |
| 7,678,941 B2 | 3/2010 | Savu | |
| 8,449,970 B2 | 5/2013 | Pellerite | |
| 2003/0114560 A1 | 6/2003 | Yang | |
| 2011/0021691 A1* | 1/2011 | Chiang | C07C 219/08 524/521 |
| 2012/0288675 A1 | 11/2012 | Klun | |

FOREIGN PATENT DOCUMENTS

| | | |
|---|---|---|
| CN | 101768884 | 7/2010 |
| FR | 2976486 | 12/2012 |
| JP | 2005-120158 | 5/2005 |
| JP | 2006-036885 | 2/2006 |
| JP | 2007-009042 | * 1/2007 |
| JP | 2009-091390 | 4/2009 |
| JP | 2009-144051 | 7/2009 |
| JP | 2012-057110 | 3/2012 |
| WO | WO 2011-031442 | 3/2011 |
| WO | WO 2013-166198 | 11/2013 |
| WO | WO 2016-099995 | 6/2016 |
| WO | WO 2016-099996 | 6/2016 |

OTHER PUBLICATIONS

Translation of JP 2007-009042 (2007) (Year: 2007).*
Weng, Journal of Applied Polymer Science, vol. 118, p. 1313-1319 (2010) (Year: 2010).*
Shaplov, Macromolecules, 2011, vol. 44, p. 9792-9803 (Year: 2011).*
International Search Report for PCT International Application No. PCT/US2015/063920, dated Mar. 3, 2016, 4 pages.

* cited by examiner

*Primary Examiner* — Robert C Boyle
(74) *Attorney, Agent, or Firm* — Bradford B. Wright

(57) ABSTRACT

Antistatic polymers include divalent segments represented by the formula wherein $R^1$ represents an alkyl group having from 6 to 18 carbon atoms, $R^2$ and $R^3$ represent alkyl groups having from 1 to 4 carbon atoms, and $R^4$ represents an alkylene group having from 2 to 8 carbon atoms. Methods of making antistatic polymers are also disclosed.

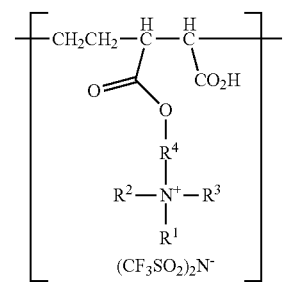

15 Claims, No Drawings

ANTISTATIC POLYMERS AND METHODS OF MAKING THE SAME

TECHNICAL FIELD

The present disclosure broadly relates to antistatic polymers and methods of making them.

BACKGROUND

Antistats or antistatic agents are used to dissipate electrostatic or static charge. Electrostatic charge buildup is responsible for a variety of problems in the processing and the use of many industrial products and materials. Electrostatic charging can cause materials to stick together or to repel one another. In addition, static charge buildup can cause objects to attract dirt and dust that can lead to fabrication or soiling problems and can impair product performance. Sudden electrostatic discharges from insulating objects can also be a serious problem. When flammable materials are present, a static electric discharge can serve as an ignition source, resulting in fires and/or explosions.

Electrostatic charge is a particular problem in the electronics industry, because modern electronic devices are extremely susceptible to permanent damage by electrostatic discharges. The buildup of electrostatic charge on insulating objects is especially common and problematic under conditions of low humidity and when liquids or solids move in contact with one another (tribocharging).

Static charge build-up can be controlled by increasing the electrical conductivity of a material. This can be accomplished by increasing ionic or electronic conductivity. The most common means of controlling static accumulation today is by increasing electrical conductivity through moisture adsorption. This is commonly achieved by adding moisture to the surrounding air (humidification) or by the use of hygroscopic antistatic agents, which are generally referred to as humectants because they rely on the adsorption of atmospheric moisture for their effectiveness. Most antistatic agents operate by dissipating static charge as it builds up; thus, static decay rate and surface conductivity are common measures of the effectiveness of antistatic agents. Antistatic agents can be applied to the surface (external antistatic agent) or incorporated into the bulk (internal antistatic agent) of the otherwise insulating material. Internal antistatic agents are commonly employed in polymers such as plastics.

Generally, internal antistatic agents fall into one of the following classes: (1) ones that are mixed directly into a molten polymer during melt processing; (2) ones that are mixed into a polymer solution, coated, and dried, or (3) ones that dissolve into a monomer (with or without a solvent) that is subsequently polymerized.

Antistatic agents are known and used over a broad range of chemical classes, including organic amines and amides, esters of fatty acids, organic acids, polyoxyethylene derivatives, polyhydric alcohols, metals, carbon black, semiconductors, and various organic and inorganic salts. Many are also surfactants and can be neutral or ionic in nature. Many low molecular weight, neutral antistatic agents have sufficiently high vapor pressures and thus are unsuitable for use at high temperatures (e.g., polymer melt processing) due to material losses that occur via evaporation. Many other neutral antistatic agents have insufficient thermal stability to survive polymer melt processing or other high temperature processing conditions.

Most non-metallic antistatic agents are generally humectants that rely on the adsorption and conductivity of water for charge dissipation. Thus, their effectiveness is typically diminished at low atmospheric humidity. Because many of these antistatic agents are also water-soluble, they are easily removed by exposure of the material to water (e.g., washing) and therefore are not very durable.

Metal salts of inorganic, organic, and fluoroorganic anions are also useful as antistatic agents in certain polymer compositions. Alkali metal salts are most commonly used due to cost and toxicity considerations and to the high affinity of alkali metal cations, especially lithium, for water. However, most metal salts are not compatible with polymers of moderate to low polarity, such as polypropylene, polyester, and polycarbonate. This incompatibility can result in inadequate antistatic agent performance and/or an unacceptable reduction in physical properties or transparency in a finished polymeric article. Consequently, the use of metal salts as internal antistatic agents is generally limited to highly polar and/or hydrophilic polymer matrices.

SUMMARY

There is a continuing need for antistatic agents, and especially antistatic agents that can be incorporated into coatings and polymer melt compositions.

The present inventors have discovered that the chemical group

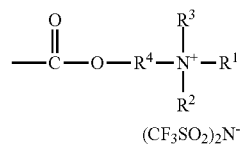

when incorporated in various polymers having hydrophilic groups can impart at least a degree of antistatic properties to the polymers.

In a first aspect, the present disclosure provides an antistatic polymer comprising:
divalent segments a) represented by the formula

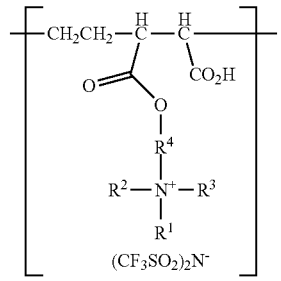

wherein
$R^1$ represents an alkyl group having from 6 to 18 carbon atoms,
$R^2$ and $R^3$ independently represent alkyl groups having from 1 to 4 carbon atoms, and
$R^4$ represents an alkylene group having from 2 to 8 carbon atoms.

In a second aspect, the present disclosure provides a method of making an antistatic polymer, the method comprising:

reacting at least a portion of an alternating copolymer of ethylene and maleic anhydride with an ionic alcohol represented by the formula

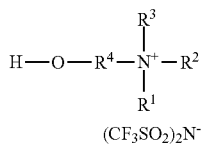

wherein $R^1$ represents an alkyl group having from 6 to 18 carbon atoms, $R^2$ and $R^3$ independently represent alkyl groups having from 1 to 4 carbon atoms, and $R^4$ represents an alkylene group having from 2 to 8 carbon atoms.

While divalent segments show in formulas contained herein are written in a specific left to right orientation (e.g., -A-B-), it will be recognized that they may also be incorporated into the antistatic polymer (as written from left to right) alternatively as (-B-A-) since it is the same divalent segment. No particularly orientation relative to other divalent segments present in the antistatic polymer is intended by the structural depiction given.

Features and advantages of the present disclosure will be further understood upon consideration of the detailed description as well as the appended claims.

DETAILED DESCRIPTION

Antistatic polymers according to the present disclosure comprise divalent segments a) represented by the formula

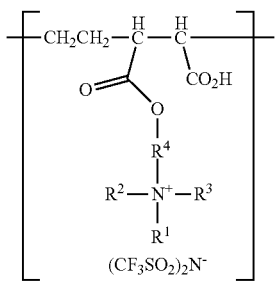

$R^1$ represents an alkyl group having from 6 to 18 carbon atoms, preferably 6 to 10 carbon atoms. Examples include hexyl, heptyl, octyl, isooctyl, nonyl, decyl, dodecyl, hexadecyl, and octadecyl groups.

$R^2$ and $R^3$ independently represent alkyl groups having from 1 to 4 carbon atoms, preferably 1 or 2 carbon atoms. Examples include, methyl, ethyl, propyl, isopropyl, and butyl groups.

$R^4$ represents an alkylene group having from 2 to 8 carbon atoms, preferably 2 to 4 carbon atoms. Examples include ethyl, propyl, isopropyl, butyl, pentyl, hexyl, cyclohexyl, heptyl, octyl, and isooctyl groups.

Optionally, antistatic polymers according to the present disclosure may further comprise divalent segments b) represented by the formula

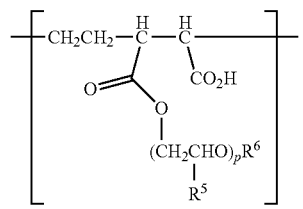

Each $R^5$ independently represents H or methyl, preferably H.

Each $R^6$ independently represents an alkyl group having from 1 to 6 carbon atoms, preferably 1 or 2 carbon atoms. Example include methyl, ethyl, propyl, butyl, pentyl, hexyl, and cyclohexyl groups.

Each p independently represents a positive integer. Preferably, p is at least 8, more preferably at least 10.

Although written in a left-to right orientation, it will be recognized that divalent segments a) and b) may equally be written in the opposite right to left orientation as incorporated into the polymer.

Antistatic polymers according to the above embodiment can be made, for example by a ring opening reaction of at least some of the anhydride groups of an alternating maleic anhydride-ethylene (1:1) copolymer with a corresponding alcohol containing a quaternary ammonium bis(trifluoromethanesulfonyl)imide salt, optionally in the presence of an acid catalyst.

Alternating maleic anhydride-ethylene copolymers (CAS No. 9006-26-2) can be prepared by co-polymerization of maleic anhydride with ethylene according to known methods. Commercial suppliers include, for example, Vertellus Specialties, Indianapolis, Ind., under the trade designation "ZEMAC COPOLYMER" and Polysciences, Inc., Warrington, Pa.

Suitable ionic alcohols containing a quaternary ammonium bis(trifluoromethanesulfonyl)imide salt can be prepared according to known methods; for example, according to methods described in U.S. Pat. No. 6,706,920 B2 (Lamanna et al.). For example, Example 1 of that patent describes the preparation of octyldimethyl-2-hydroxyethylammonium bis(trifluoromethanesulfonyl)imide.

Likewise, divalent segment b) may result from reaction of a polyether alcohol with the anhydride groups on the ethylene-maleic anhydride copolymer. Such alcohols have the formula

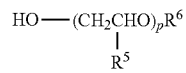

wherein $R^5$, $R^6$, and p are as previously defined. Polyether alcohols of this type include, for example poly(ethylene glycol) methyl ether, poly(propylene glycol) butyl ether, and poly(ethylene glycol-ran-propylene glycol) monobutyl ether. Suitable polyether alcohols are widely available from commercial suppliers such as, for example, Aldrich Chemical Co., Milwaukee, Wis., and from Dow Chemical Co., Midland, Mich., as CARBOWAX SENTRY methoxypolyethylene glycols. Alternatively, they can be made according to conventional methods.

In some embodiments, the reaction of the ionic alcohol(s) and optional polyether alcohol(s) may be carried out so as to achieve reaction with all of the anhydride groups in the polymer. In other embodiments, the stoichiometry may be adjusted such that less than all of the groups (e.g., less than 90 percent, less than 70 percent, less than 50 percent, less than 30 percent, or even less than 10 percent) are reacted, resulting in the antistatic polymer having one or more divalent segments represented by the formula

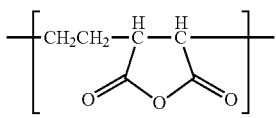

due to residual anhydride functionality. Ring opening of the anhydride groups may be accomplished by reaction with additional alcohols, amines, and/or water (hydrolysis). In the case of hydrolysis the antistatic polymer will further comprise one or more divalent segments represented by the formula

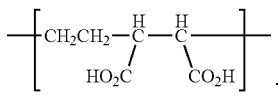

On a molar basis, the ratio of divalent segment a) to divalent segment b) may be, for example, from is from 1:99 to 50:50, preferably from 40:60 to 50:50, and in some embodiments preferably about 50:50.

If desired, antistatic polymers according to the present disclosure can be combined with one or more conventional additives commonly used in the art such as, for example, dyes, pigments, antioxidants, ultraviolet stabilizers, flame retardants, surfactants, plasticizers, tackifiers, fillers, and mixtures thereof to provide an antistatic composition. In particular, performance enhancers (for example, polymers such as polybutylene) can be utilized to improve the antistatic characteristics in, for example, melt additive polyolefin applications.

Antistatic polymers according to the present disclosure can be used in coating compositions (e.g., as dissolved or dispersed in water and/or organic solvent) or with various insulating (e.g., dielectric) materials (i.e., coated directly onto an insulating material) provided these antistatic polymers are compatible with the coating and/or insulating materials. Thus, the antistatic polymer preferably performs well as an antistat and does not adversely affect other properties of the coating and/or insulating materials.

Antistatic polymers according to the present disclosure may comprise about 0.1 to about 50 weight percent of an antistatic coating composition, based on the solids in the coating composition.

Antistatic coating compositions including an antistatic polymer according to the present disclosure can be applied from aqueous or organic solvents (including solutions of binders) to a variety of insulating materials including, for example, fabric, fibers, electronic components, electronic packaging, compact discs, and molded or blown objects (e.g., surgical gowns). The coating composition is preferably water-based, but may contain organic solvent. In some embodiments, the coating composition is solvent-based. Examples of solvents include ethers, esters, ketones, and alcohols.

Insulating materials that are suitable for topical treatment include materials that have relatively low surface and bulk conductivity and that are prone to static charge build-up. These materials include both synthetic and naturally-occurring polymers (or the reactive precursors thereof, for example, mono- or multifunctional monomers or oligomers) that can be either organic or inorganic in nature, as well as ceramics, glasses, and ceramic/polymer composites, ceramers, or the reactive precursors thereof.

Insulating materials that are suitable for blending with antistatic polymers according to the present disclosure may include thermoplastic polymers and thermosetting compositions, for example. Suitable synthetic polymers (which can be either thermoplastic or thermoset) include commodity plastics such as, for example, poly(vinyl chloride), polyethylenes (high density, low density, very low density), polypropylene, polybutylene, and polystyrene; engineering plastics such as, for example, polyesters (including, for example, poly(ethylene terephthalate) and polybutylene terephthalate), polyamides (aliphatic, amorphous, aromatic), polycarbonates (for example, aromatic polycarbonates such as those derived from bisphenol A), polyoxymethylenes, polyacrylates and polymethacrylates (for example, poly(methyl methacrylate)), some modified polystyrenes (for example, styrene-acrylonitrile (SAN) and acrylonitrile-butadiene-styrene (ABS) copolymers), high-impact polystyrenes (SB), fluoroplastics, and blends such as poly(phenylene oxide)-polystyrene and polycarbonate-ABS; high-performance plastics such as, for example, liquid crystalline polymers (LCPs), polyetherketone (PEK), polysulfones, polyimides, and polyetherimides; thermosets such as, for example, alkyd resins, phenolic resins, amino resins (for example, melamine and urea resins), epoxy resins, unsaturated polyesters (including so-called vinyl esters), polyurethanes, allylics (for example, polymers derived from allyl diglycol carbonate), fluoroelastomers, and polyacrylates; and the like and blends thereof. Suitable naturally occurring polymers include proteinaceous materials such as silk, wool, and leather; and cellulosic materials.

Thermoplastic and thermoset polymers, including those described above, are preferred insulating materials, as these polymers can either be topically treated with the antistat or can be combined with the antistat (in bulk) to form a blend. Melt processing of the antistat into a thermoplastic polymer is preferred, because it eliminates the use of hazardous solvents and volatile organic compounds (VOCs). Preferably, the thermoplastic polymers are melt-processable at elevated temperatures, for example, above about 150° C., more preferably above about 240° C., and even more preferably above about 280° C. Preferred thermoplastic polymers include, for example, polypropylene, polyethylene, polybutylene, copolymers of ethylene and one or more alpha-olefins (for example, poly(ethylene-butene) and poly(ethylene-octene)), polyesters, polyurethanes, polycarbonates, polyetherimides, polyimides, polyetherketones, polysulfones, polystyrenes, ABS copolymers, polyamides, fluoroelastomers, and blends thereof.

The antistatic polymer can also be blended with monomers, curable oligomers, or curable polymers followed by polymerization or curing to form a crosslinked thermoset polymer containing the antistat. For example, the antistatic polymers may be crosslinked through their carboxylic acid functionality by reaction with polymers or oligomers having aziridine, oxazoline, or carbodiimide functionality. Preferred thermoset polymers include polyurethanes, epoxy resins, and unsaturated polyesters.

Antistatic polymers according to the present disclosure can further be applied to an insulating material using techniques known in the art such as, but not limited to, dip coating, spray coating, swirl coating, spin coating, extrusion hopper coating, curtain coating, gravure coating, air knife coating, and the like. The coating thickness varies as a function of the insulating material.

Select Embodiments of the Present Disclosure

In a first embodiment, the present disclosure provides an antistatic polymer comprising:
divalent segments a) represented by the formula

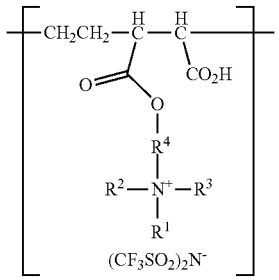

wherein
$R^1$ represents an alkyl group having from 6 to 18 carbon atoms,
$R^2$ and $R^3$ independently represent alkyl groups having from 1 to 4 carbon atoms, and
$R^4$ represents an alkylene group having from 2 to 8 carbon atoms.

In a second embodiment, the present disclosure provides an antistatic polymer according to the first embodiment, further comprising divalent segments b) represented by the formula

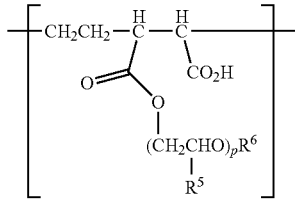

wherein
each $R^5$ independently represents H or methyl,
each $R^6$ independently represents an alkyl group having from 1 to 6 carbon atoms, and
each p independently represents a positive integer.

In a third embodiment, the present disclosure provides an antistatic polymer according to the first or second embodiment, wherein has from 6 to 10 carbon atoms.

In a fourth embodiment, the present disclosure provides an antistatic polymer according to any one of the first to third embodiments, wherein $R^4$ has from 2 to 4 carbon atoms.

In a fifth embodiment, the present disclosure provides an antistatic polymer according to any one of the first to fourth embodiments, wherein $R^5$ has from 2 to 4 carbon atoms.

In a sixth embodiment, the present disclosure provides an antistatic polymer according to any one of the first to fifth embodiments, further comprising divalent segments represented by the formula

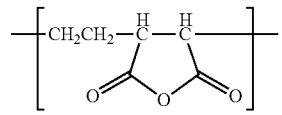

In a seventh embodiment, the present disclosure provides an antistatic polymer according to any one of the first to sixth embodiments, further comprising divalent segments represented by the formula

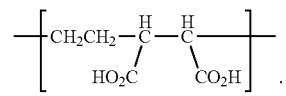

In an eighth embodiment, the present disclosure provides an antistatic polymer according to any one of the second to seventh embodiments, wherein on a molar basis the ratio of divalent segment a) to divalent segment b) is from 40:60 to 50:50.

In a ninth embodiment, the present disclosure provides a method of making an antistatic polymer, the method comprising:
reacting at least a portion of an alternating copolymer of ethylene and maleic anhydride with an ionic alcohol represented by the formula

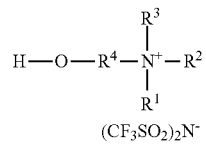

wherein
$R^1$ represents an alkyl group having from 6 to 18 carbon atoms,
$R^2$ and $R^3$ independently represent alkyl groups having from 1 to 4 carbon atoms, and
$R^4$ represents an alkylene group having from 2 to 8 carbon atoms.

In a tenth embodiment, the present disclosure provides a method according to the ninth embodiment, further comprising reacting a portion of the alternating copolymer of ethylene and maleic anhydride with a polyether alcohol represented by the formula

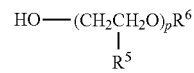

wherein
each $R^5$ independently represents H or methyl,
each $R^6$ independently represents an alkyl group having from 1 to 8 carbon atoms, and
each p independently represents a positive integer.

In an eleventh embodiment, the present disclosure provides a method according to the ninth or tenth embodiment, wherein $R^1$ has from 6 to 10 carbon atoms.

In a twelfth embodiment, the present disclosure provides a method according to any one of the ninth to eleventh embodiments, wherein $R^4$ has from 2 to 4 carbon atoms.

In a thirteenth embodiment, the present disclosure provides a method according to any one of the ninth to twelfth embodiments, wherein the antistatic polymer further comprises the divalent segment

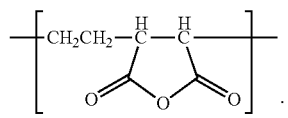

In a fourteenth embodiment, the present disclosure provides a method according to any one of the ninth to thirteenth embodiments, further comprising divalent segments represented by the formula

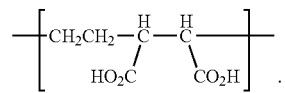

In a fifteenth embodiment, the present disclosure provides a method according to any one of the tenth to fourteenth embodiments, wherein on a molar basis the ratio of the ionic alcohol to the polyether alcohol is from 40:60 to 50:50.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

The following designations are used in the Examples:

| DESIGNATION | DESCRIPTION and SOURCE |
|---|---|
| ZeMAC E60 | ethylene maleic anhydride alternating copolymer, MW = 60,000 g/mol obtained as ZEMAC E60 from Vertellus Specialties, Inc. Indianapolis, Indiana |
| EPOCROS WS-500 | Oxazoline-functional polymer obtained as EPOCROS WS-500 from Nippon Shokubai Co., LTD, Osaka, Japan |
| F-ODMHEA | Octyldimethyl-2-hydroxyethylammonium bis-(trifluoromethanesulfonyl)imide prepared generally as described in Example 1 of U.S. Pat. No. 6,706,920 B2 (Lamanna et al.) |
| MEK | methyl ethyl ketone |
| Me-PEG-OH | poly(ethylene glycol) methyl ether, $M_n$ = 750 g/mol, Aldrich Chemical Company, Milwaukee, Wisconsin |
| PET | Polyethylene terephthalate film, 2 mils (50 micrometers) thick from 3M Company, Saint Paul, Minnesota |

All other materials were or can be obtained from Aldrich Chemical Company, Milwaukee, Wis.

Test Method for Measuring Surface Resistivity and Volume Resistivity

Measurements were done on a Keithley 6517A/8009 Resistivity Test Fixture (obtained from Keithley Instruments, Inc., Cleveland, Ohio) using ASTM D257-07 "Standard Test Methods for DC Resistance or Conductance of Insulating Materials" "protocol. The applied voltage was 100 V. The upper limit of surface resistivity measurable by this setup is $10^{17} \Omega/\square$ (i.e., ohms per square). All tests were done under ambient conditions.

Test Method for Antistatic Testing

Static decay measurements were done on a Model 406C Electro-tech static decay meter (obtained from Electro-Tech Systems, Inc., Glenside, Pa.) using reference JKEHR008-018. Positively and negatively biased potentials of 5 kV were applied separately to each test sample, and the times required for the accumulated static charges to decay to 10% of their initial values were measured, up to a maximum of 60 sec. All tests were done under ambient conditions.

Example 1

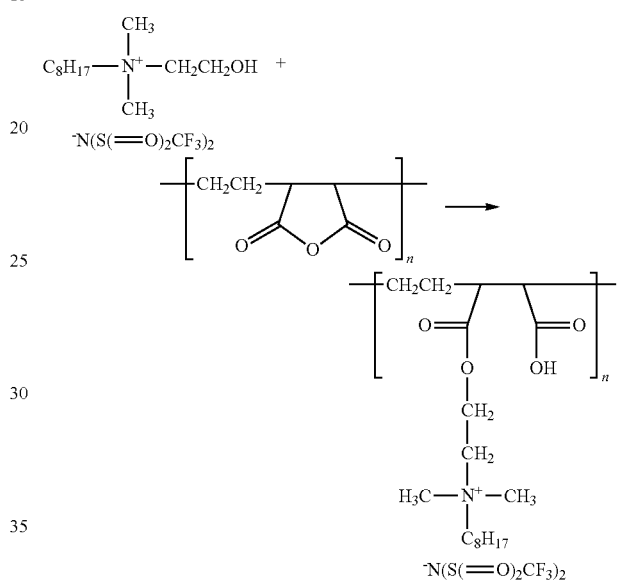

ZeMAC E60 (6.3 g, 0.05 mol), 23.1 g of F-ODMHEA (0.05 mol), and 50 g of acetone were mixed in autoclave, and heated to 120 C for 10 hours. After cooling down a clear solution was prepared. Then, 10 g of above solution (solids were 3.75 g), 0.25 g of triethylamine, and 15 g of water were mixed. Evaporation of acetone gave an emulsion solution (20 wt. %).

EPOCROS WS-500 (0.4 g) was diluted with 3 g of water. Then, 1.6 g of above emulsion was added and mixed to form Example 1 coating mixture which was coated on a PET substrate using a #10 Mayer rod (nominal wet thickness of 23 micrometers) and heated at 140 C for 2 minutes. A nice and durable coating was formed. Samples were analyzed for antistatic properties as described above. Table 1 (below) reports the antistatic properties of bare PET substrate and Example 1 coated sample, wherein "WNC" means would not charge.

TABLE 1

| SAMPLE | SIDE | $S_R$, ohm/square | $V_R$, ohm-cm | STATIC DECAY, seconds +5 kV | -5 kV |
|---|---|---|---|---|---|
| Bare PET | A | $2 \times 10^{15}$ | $1 \times 10^{16}$ | >30 | WNC |
|  | B | $1 \times 10^{17}$ | $1 \times 10^{16}$ | >30 | WNC |
| Example 1 | Coated | $1.3 \times 10^{11}$ | $1 \times 10^{14}$ | 0.33 | 0.32 |
|  | Uncoated | $1 \times 10^{16}$ | $7 \times 10^{15}$ | 0.42 | 0.48 |

Example 2

ZeMAC E60 (6.3 g, 0.05 mol), 18.48 g of F-ODMHEA (0.04 mol, 6.5 g of Me-PEG-OH (0.01 mol), and 50 g of acetone were mixed in an autoclave and heated to 120° C. for 10 hours. After cooling down a clear solution was prepared.

EPOCROS WS-500 (0.33 g) and 1 g of above solution were mixed to form Example 2 coating mixture which was coated on a PET substrate using a #10 Mayer rod and cured at 140 C for 2 minutes. A nice and durable coating was formed. Sample was analyzed for antistatic properties as described above. Table 2, below summarizes the antistatic properties of bare PET substrate and Example 2 coated sample.

TABLE 2

| SAMPLE | SIDE | $S_R$, ohm/sq | $V_R$, ohm-cm | STATIC DECAY, seconds +5 kV | STATIC DECAY, seconds −5 kV |
|---|---|---|---|---|---|
| Bare PET | A | $3 \times 10^{15}$ | $5 \times 10^{15}$ | >60 | >60 |
|  | B | $5.4 \times 10^{13}$ | $1.6 \times 10^{15}$ | — | — |
| Example 2 | Coated | $7.0 \times 10^{9}$ | $3.3 \times 10^{12}$ | 0.02 | 0.03 |
|  | Uncoated | $3.0 \times 10^{14}$ | $2.8 \times 10^{15}$ | 0.04 | 0.02 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An antistatic polymer comprising:
   divalent segments a) represented by the formula

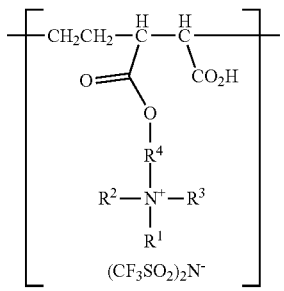

wherein
   $R^1$ represents an alkyl group having from 6 to 18 carbon atoms,
   $R^2$ and $R^3$ independently represent alkyl groups having from 1 to 4 carbon atoms, and
   $R^4$ represents an alkylene group having from 2 to 8 carbon atoms.

2. The antistatic polymer of claim 1, further comprising divalent segments b) represented by the formula

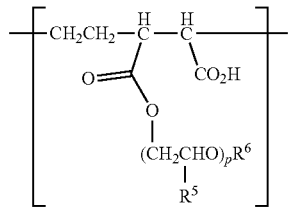

wherein
   each R independently represents H or methyl,
   each $R^6$ independently represents an alkyl group having from 1 to 6 carbon atoms, and
   each p independently represents a positive integer.

3. The antistatic polymer of claim 1, wherein $R^1$ has from 6 to 10 carbon atoms.

4. The antistatic polymer of claim 1, wherein $R^4$ has from 2 to 4 carbon atoms.

5. The antistatic polymer of claim 1, wherein $R^5$ has from 2 to 4 carbon atoms.

6. The antistatic polymer of claim 1, further comprising divalent segments represented by the formula

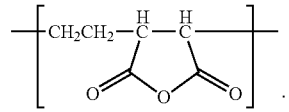

7. The antistatic polymer of claim 1, further comprising divalent segments represented by the formula

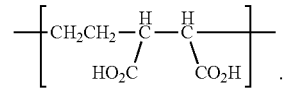

8. The antistatic polymer of claim 2, wherein on a molar basis the ratio of divalent segment a) to divalent segment b) is from 40:60 to 50:50.

9. A method of making an antistatic polymer, the method comprising:
   reacting at least a portion of an alternating copolymer of ethylene and maleic anhydride with an ionic alcohol represented by the formula

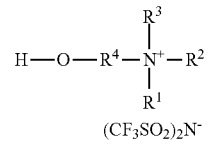

wherein
   $R^1$ represents an alkyl group having from 6 to 18 carbon atoms,
   $R^2$ and $R^3$ independently represent alkyl groups having from 1 to 4 carbon atoms, and
   $R^4$ represents an alkylene group having from 2 to 8 carbon atoms.

10. The method of claim 9, further comprising reacting a portion of the alternating copolymer of ethylene and maleic anhydride with a polyether alcohol represented by the formula

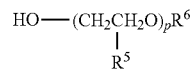

wherein each $R^5$ independently represents H or methyl, each $R^6$ independently represents an alkyl group having from 1 to 8 carbon atoms, and each p independently represents a positive integer.

11. The method of claim 9, wherein R has from 6 to 10 carbon atoms.

12. The method of claim 9, wherein $R^4$ has from 2 to 4 carbon atoms.

13. The method of claim 9, wherein the antistatic polymer further comprises the divalent segment

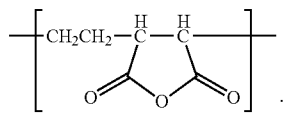

14. The method of claim 9, further comprising divalent segments represented by the formula

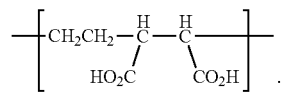

15. The method of claim 10, wherein on a molar basis the ratio of the ionic alcohol to the polyether alcohol is from 40:60 to 50:50.

* * * * *

UNITED STATES PATENT AND TRADEMARK OFFICE
CERTIFICATE OF CORRECTION

PATENT NO. : 10,227,426 B2  
APPLICATION NO. : 15/532856  
DATED : March 12, 2019  
INVENTOR(S) : Yu Yang Page 1 of 1

It is certified that error appears in the above-identified patent and that said Letters Patent is hereby corrected as shown below:

In the Specification

Column 6  
Line 16, Delete "polybutylene" and insert -- poly(butylene --, therefor.

Column 7  
Line 56, After "wherein" insert -- $R^1$ --.

In the Claims

Column 12  
Line 15 (Approx.), In Claim 2, delete "R" and insert -- $R^5$ --, therefor.

Column 13  
Line 17 (Approx.), In Claim 11, delete "R" and insert -- $R^1$ --, therefor.

Signed and Sealed this  
Twenty-second Day of October, 2019

Andrei Iancu  
*Director of the United States Patent and Trademark Office*